US007301659B2

(12) United States Patent
Timperman et al.

(10) Patent No.: US 7,301,659 B2
(45) Date of Patent: Nov. 27, 2007

(54) SYSTEMS AND METHODS FOR USE OF PROFILES IN MULTIFUNCTION DEVICES

(75) Inventors: Michael R. Timperman, Versailles, KY (US); Charles E. Grieshaber, Versailles, KY (US); Christopher R. Nash, Lexington, KY (US); Ronald D. Parrott, Lexington, KY (US); Craig A. Rudolph, Lexington, KY (US); Timothy S. Seevers, Lexington, KY (US); Suzanne M. Thompson, Lexington, KY (US); William J. Flowers, Lexington, KY (US); Allen W. Waugerman, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 766 days.

(21) Appl. No.: 10/230,828

(22) Filed: Aug. 29, 2002

(65) Prior Publication Data

US 2004/0042027 A1 Mar. 4, 2004

(51) Int. Cl.
*G06F 15/00* (2006.01)

(52) U.S. Cl. .................... 358/1.15; 358/1.13; 358/1.16

(58) Field of Classification Search ............... 358/1.13, 358/1.15, 1.16; 399/80, 81; 707/103 R; 713/321; 380/55; 235/382
See application file for complete search history.

(56) References Cited

U.S. PATENT DOCUMENTS

| | | | | |
|---|---|---|---|---|
| 4,642,792 | A | 2/1987 | Clements et al. | |
| 5,077,795 | A * | 12/1991 | Rourke et al. | 380/55 |
| 5,199,063 | A | 3/1993 | Erickson et al. | |
| 5,357,350 | A | 10/1994 | Matsunai | |
| 5,384,632 | A | 1/1995 | Nakajima et al. | |
| 5,438,433 | A | 8/1995 | Reifman et al. | |
| 5,499,108 | A | 3/1996 | Cotte et al. | |
| 5,764,866 | A | 6/1998 | Maniwa | |
| 5,798,848 | A | 8/1998 | Ouchi | |
| 5,806,081 | A | 9/1998 | Swen et al. | |
| 5,835,627 | A | 11/1998 | Higgins et al. | |
| 5,905,581 | A | 5/1999 | Suzuki et al. | |
| 5,970,225 | A | 10/1999 | Jackson et al. | |
| 5,982,507 | A | 11/1999 | Weiser et al. | |
| 6,091,507 | A | 7/2000 | Vatland et al. | |
| 6,091,518 | A | 7/2000 | Anabuki | |
| 6,094,221 | A | 7/2000 | Andersion | |
| 6,108,008 | A | 8/2000 | Ohta | |
| 6,118,546 | A * | 9/2000 | Sanchez et al. | 358/1.6 |
| 6,128,415 | A | 10/2000 | Hultgren, III et al. | |
| 6,147,769 | A | 11/2000 | Jackson et al. | |
| 6,181,893 | B1 * | 1/2001 | Collard et al. | 399/80 |
| 6,219,153 | B1 | 4/2001 | Kawanabe et al. | |
| 6,229,620 | B1 | 5/2001 | Makitani et al. | |
| 6,292,271 | B1 | 9/2001 | Phan | |
| 6,344,905 | B1 | 2/2002 | An | |

(Continued)

*Primary Examiner*—King Y. Poon
*Assistant Examiner*—Vincent Rudolph

(57) ABSTRACT

A system and method for the selection and execution of a profile. The system and method comprise a data store capable of storing profiles, a user console allowing interaction between a user and a multifunction device, a communication interface adapted to allow communication via at least one communication channel and a processor in communication with the communication interface, the data store and the user console. The processor receives a profile from a profile source via the communication interface, stores the received profile in the data store, receives an indicator corresponding to a selected profile and executes the selected profile to perform an operation of the multifunction device.

12 Claims, 7 Drawing Sheets

U.S. PATENT DOCUMENTS

| | | | | |
|---|---|---|---|---|
| 6,928,564 | B2 * | 8/2005 | Tada et al. | 713/321 |
| 2001/0017700 | A1 | 8/2001 | Homma | |
| 2001/0035972 | A1 * | 11/2001 | Wurmfeld | 358/1.13 |
| 2001/0048823 | A1 | 12/2001 | Nomura et al. | |
| 2002/0006291 | A1 | 1/2002 | Kuboki | |
| 2002/0069234 | A1 | 6/2002 | McIntyre | |
| 2002/0111984 | A1 | 8/2002 | Getler et al. | |
| 2003/0038839 | A1 * | 2/2003 | Simpson et al. | 345/745 |
| 2004/0034654 | A1 * | 2/2004 | Simpson et al. | 707/103 R |

* cited by examiner

SYSTEMS AND METHODS FOR USE OF PROFILES IN MULTIFUNCTION DEVICES

BACKGROUND

The present invention relates to the field of image capturing devices and processes. More specifically, in one embodiment, the present invention relates to systems and methods for remote image capturing using interactive profiles to dynamically control aspects of image capture.

In many instances, present image capture devices do not support profiles for storing control instructions associated with recurrent image capture needs. Accordingly, such devices require manual configuration prior to each capture. Some existing image capturing devices do support static profiles to aid in the capturing of images. In such devices, each static profile includes a set of instructions used by the device to control the methods and settings for scanning and processing a document. Such profiles provide a mechanism for storing control instructions associated with recurrent image capture needs but provide a one size fits all approach to this problem.

The OPTRAIMAGE multifunction device (Lexmark International, Inc., Lexington, Ky.) is an example of a system supporting such static profiles. This device extended the static profile approached in a limited fashion by allowing users to enter one or more integers using a keypad on the device in conjunction with a selected static profile. This integer entry capability afforded limited dynamic control, such as number of copies. This limited extension did not provide a facility for dynamic control of more complex aspects of image capture and disposition potentially controllable via a profile.

A significant limitation of static profiles is that they do not provide an image capturing device operator with the capability to provide dynamic information that relates to a specific document to be captured by the device. The present invention provides a practical and efficient solution to the limitations of static profiles.

SUMMARY

In one embodiment, the present invention relates to a method and system for attaching dynamic information to a scanned document to aid in the processing and delivery of scanned documents with increased automation and decreased human intervention.

Some embodiments of the present invention relate to systems for the selection and execution of a profile. In one exemplary embodiment, the system comprises a system data store (hereinafter “SDS”) capable of storing profiles, a user console allowing interaction between a user and a multifunction device, and a communication interface adapted to allow communication via at least one communication channel. Additionally, the system comprises a system processor in communication with the communication interface, the SDS and the user console. The processor functions to receive a profile from a profile source via the communication interface, store the received profile in the SDS, receive an indicator corresponding to a selected profile and execute the selected profile to perform an operation of the multifunction device.

Further, one exemplary method of profile selection and execution includes a variety of steps that can, in certain embodiments, be executed by the systems summarized above and more fully described below, or be stored as computer executable instructions in and/or on any suitable combination of computer-readable media. First, an interactive profile is received from a remote source via a network or other suitable communication channel to a multifunction device. Each profile includes a set of executable instructions to the multifunction device that control the methods and settings to be utilized in the scanning and/or disposition of a document to be scanned by the multifunction device. The received profile can, in some embodiments, be stored. An indicator of a selected profile is received. If the selected profile is interactive, the multifunction device user is requested to interactively enter at least one non-integer parameter based upon the profile selection. One or more parameters are received responsive to the request. An operation of the multifunction device is performed based upon the profile selection and any received parameters.

In some embodiments, a list of profiles stored in the multifunction device is displayed to a multifunction device user. This display can, in some such embodiments, be performed in response to the user’s actuation of an icon displayed on a user console associated with the multifunction device. The received indicator corresponds to a profile selected from the displayed list. Additionally, in some embodiments, the performed operation includes scanning a document, packaging profile information into a data structure and transmitting the data structure and the scanned document to a destination.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF DRAWINGS

The accompanying drawings, which are incorporated in and constitute a part of this specification, illustrate embodiments of the invention, and together with the description, serve to explain the principles of the invention.

DETAILED DESCRIPTION

Several embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views. As utilized in the description herein and throughout the claims that follow, the meaning of “a,” “an,” and “the” include plural references also, unless the context of use clearly dictates otherwise. Additionally, the meaning of “in” includes “in” and “on” unless the context clearly dictates otherwise as the term is utilized in the description herein and throughout the claims that follow.

Figure 1:
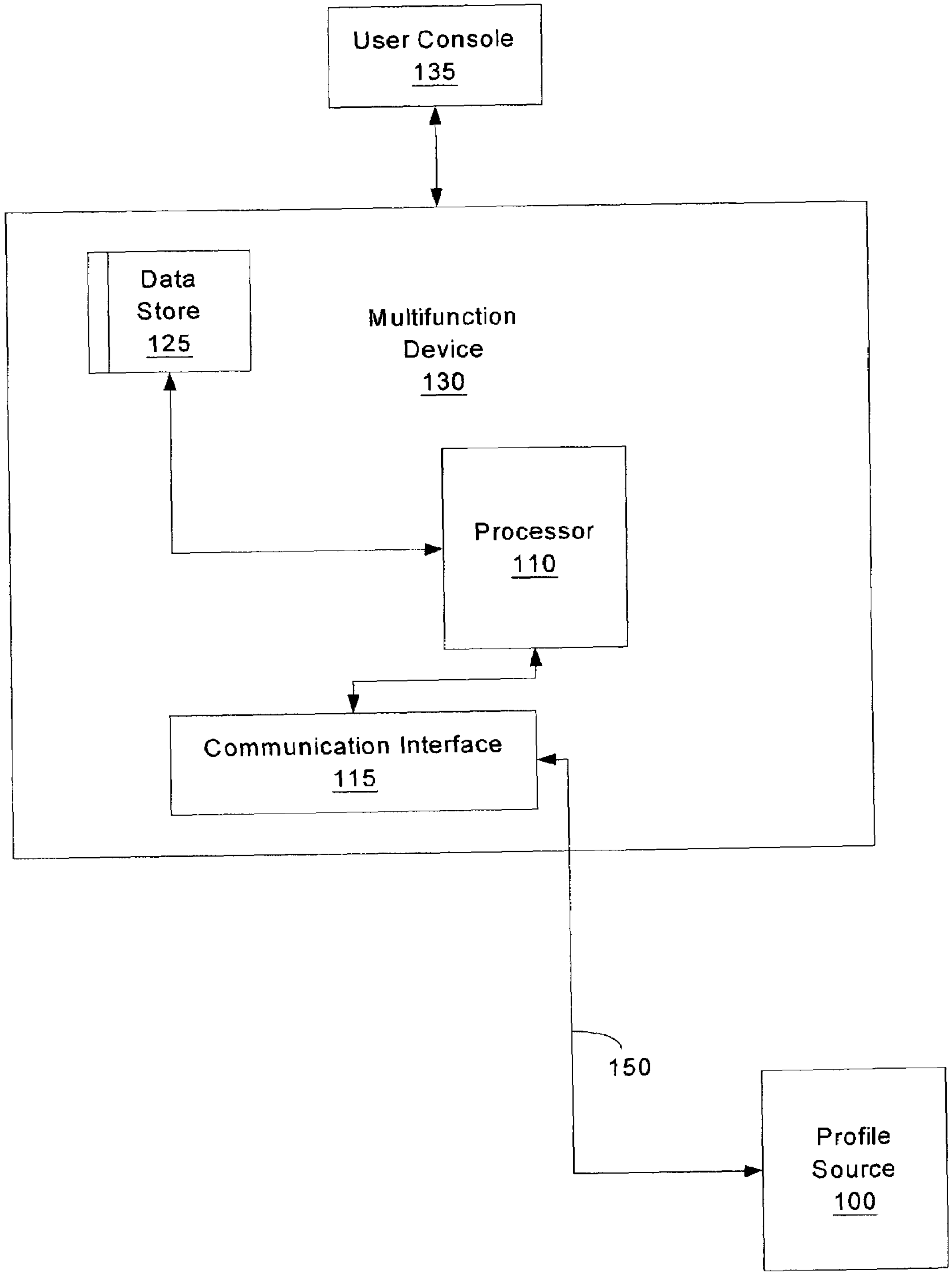
FIG. 1 is a block diagram illustrating an exemplary embodiment of the present invention.

One embodiment of the present invention is initially described with reference to FIG. 1. FIG. 1 is a block diagram illustrating one system embodiment of the present invention. An interactive profile is transmitted via a communication channel 150 to the processor 110 from a profile source 100. The processor 110 stores the received profile in an SDS 125. The SDS 125, in some embodiments, can store both interactive and non-interactive profiles. The processor 110 and the SDS 125 are associated with the multifunction device 130.

In one exemplary embodiment, a profile is executed when a user of the multifunction device 130 inserts a document into an automatic document feeder (not shown) of the multifunction device 130 and selects a profile setting that is displayed on a display screen located on a console 135. The display screen can, in some embodiments, include and/or employ known touch-screen technology. Alternatively, the user console can consist of a display screen and associated buttons for selecting and navigating items displayed. The user console can be either associated with or integrated with the multifunction device. In some embodiments, the user console includes a touch screen equipped with sensors that register touch events and generate one or more signals in response for delivery to a system processor for subsequent action.

In some cases a software driver may be necessary to translate the signal(s) generated by the touch screen to a signal that is recognizable by a particular system processor. Any suitable touch screen technology, such as resistive, capacitive, or surface acoustic wave type touch screens, can be used in various embodiments of the present inventions. Touch screens can use liquid crystal display (LCD), cathode ray tube (CRT), plasma screen or other type monitors. The profile execution and management according to the present invention, however, are not directed to any particular touch screen hardware configuration or architecture, and may be used with user consoles of any type. Likewise, the present invention is not limited to use in connection with an MFD with any particular combination of operational capabilities. Further, in some embodiments, profile execution need not require insertion of a document; rather, profile execution can begin upon selection of the profile from the user console.

If the profile selected from a listing of profiles displayed on the multifunction device's 130 display screen is a non-interactive profile, then the multifunction device 130 can execute the profile without requiring further user interaction. If the user selected profile is an interactive profile, a combination of one or more interfaces (such as illustrated in FIGS. 5-11) can be displayed to the user via the user console 135. The interfaces are utilized by the system to interactively request data from the user.

In one embodiment, the user inputs requested data into the system via the console 135. The particular interfaces used depend upon the information contained in the selected profile. The document capture process begins when pre-capture-required, system requested data, if any, are obtained from the user. In some embodiments, a subset of the obtained interactive data can be subsequently packaged and included in a data structure that will precede that scanned document upon its transmittal to a final destination.

In one exemplary embodiment, the profile management and execution system includes a system processor potentially including multiple processing elements. The term processing element may refer to (1) a process running on a particular piece, or across particular pieces, of hardware, (2) a particular piece of hardware, or either (1) or (2) as the context allows. Each processing element can be supported via an ARM and/or MIPS RISC processors. Alternatively, a standard general purpose processor such as an Intel-compatible processor platforms using at least one PENTIUM III or CELERON (Intel Corp., Santa Clara, Calif.) class processor or UltraSPARC (Sun Microsystems, Palo Alto, Calif.) could be used in other embodiments.

The system processor may also include one or more application specific integrated circuits (ASICs) and/or field programmable gate arrays (FPGAs) to support all or some of the desired functionality. In some embodiments, the system processor may include a combination of general purpose processors, ASICs and/or FPGAs. In some embodiments, profile management and execution functionality, as further described below, may be distributed across multiple processing elements.

The exemplary architecture includes an SDS that could include a variety of primary and secondary storage elements. In one embodiment, the SDS would include RAM as part of the primary storage and be integrated into the multifunction device. The amount of RAM might range from 512 KB to 32 MB, although these amounts could vary and represent overlapping use (such as where the hardware platform is used for other purposes rather than solely for supporting the functionality of the present invention). The primary storage may in some embodiments include other forms of memory such as cache memory, registers, non-volatile memory (e.g, FLASH, ROM, EPROM, EEPROM etc.), etc.

The SDS can also include secondary storage including single, multiple and/or varied servers and storage elements. For example, the SDS can use internal storage devices connected to the system processor. In embodiments where a single processing element supports all of the profile management and execution functionality, a local hard disk drive can serve as the secondary storage of the SDS, and a disk operating system executing on such a single processing element may act as a data server receiving and servicing data requests.

It will be understood by those skilled in the art that the different information used in the processes and systems according to the present invention may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations.

The SDS 125 depicted in FIG. 1 is integrated within the multifunction device. This SDS depending upon the particular embodiment can include both primary and secondary storage, only primary storage or only secondary storage. In some embodiments, the SDS need not be wholly or partially integrated with the multifunction device. Rather, the SDS, or a portion thereof, can exist as a separate non-integrated unit that communicates with the system processor via any suitable communication channel. Such a communication channel could, in some embodiments, be the same as used for communication with the profile source.

The architecture of the secondary storage of the system data store can vary significantly in different embodiments. In several embodiments, database(s) are used to store and manipulate the data. In some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), can be used in connection with a variety of storage devices/file servers (that can include one or more standard magnetic and/or optical disk drives using any appropriate interface including, without limitation, IDE and SCSI). In some embodiments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof can be used. In other embodiments, the data store can use database systems with other architectures such as object-oriented, spatial, object-relational or hierarchical.

Instead of, or in addition to, those organization approaches discussed above, certain embodiments can use other storage implementations such as hash tables or flat files or combinations of such architectures. Such alternative approaches can use data servers other than database management systems such as a hash table look-up server, procedure and/or process and/or a flat file retrieval server, procedure and/or process. Further, the SDS can use a combination of any of such approaches in organizing its secondary storage architecture.

Some embodiments can also include an imaging component for scanning a document. The imaging component can be of any suitable type known to those skilled in the art. Such imaging components can be found in any commercially available scanner, copier or facsimile machine. The imaging component can be integrated and housed together with the remaining components of a system according to the present invention. In other embodiments, the imaging component can be housed separately such as in a separate scanner, copier or facsimile machine and receive profiling instructions from the remaining components of the system.

Various methods and functions as exhibited in various embodiments according to the present invention are described below with respect to profile management and execution. In some embodiments, one or more processing elements within architectures of the environments as described above may execute the stops in such methods and provide such functionality. The functionality may spread across multiple processing elements. In other embodiments, any suitable computer readable storage device, media or combination of devices and/or media, including primary storage such as RAM, ROM, cache memory, etc. or secondary storage such as magnetic media including fixed and removable disks and tapes; optical media including fixed and removable disks whether read-only or read-write; paper media including punch cards and paper tape; or other secondary storage as would be known to those skilled in the art, may store instruction that upon execution by one or more processors and/or processing element cause the one or more processors and/or processing element to execute the steps in such methods and to provide such functionality.

Figure 2:
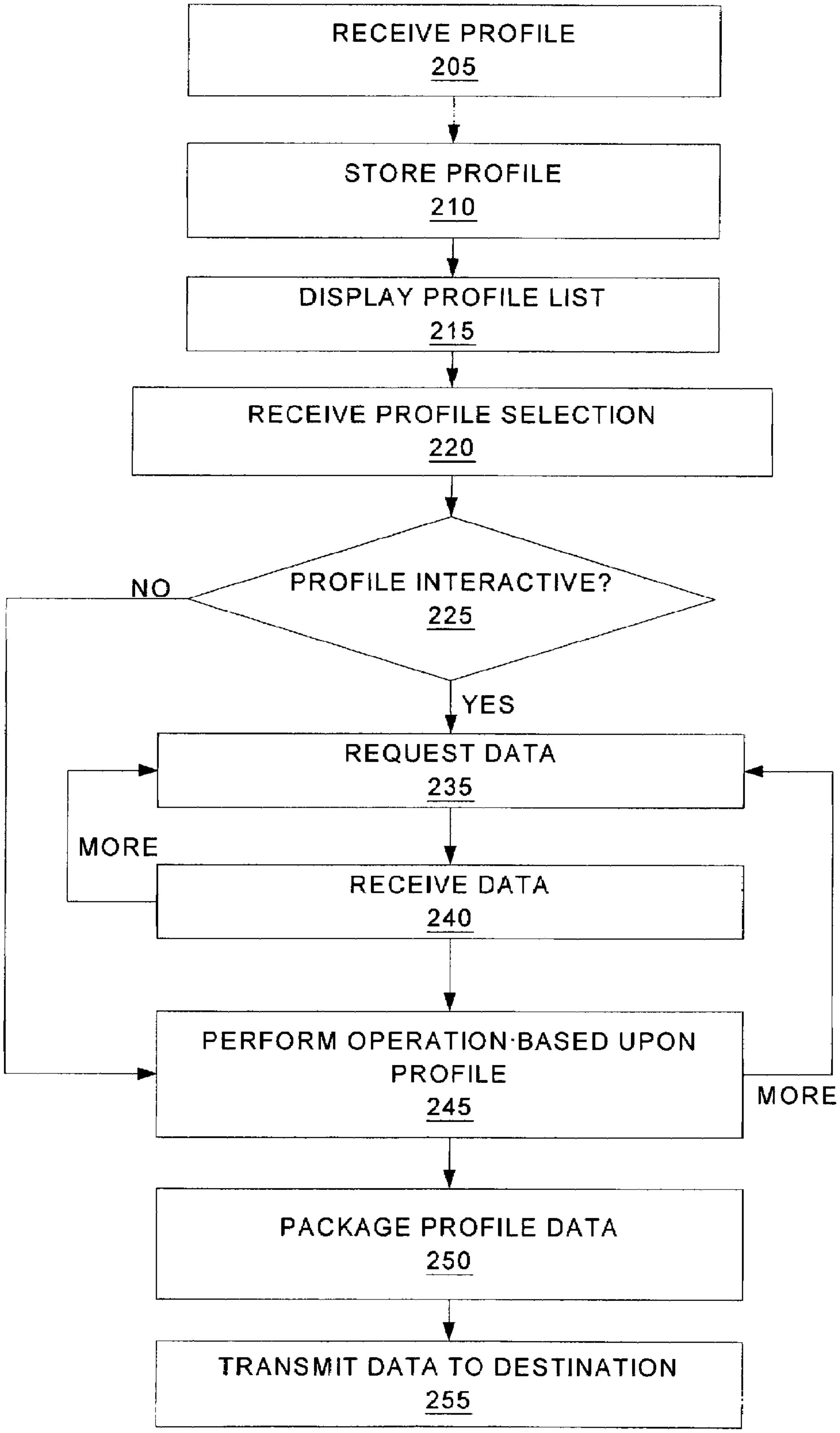
FIG. 2 is a flowchart diagram illustrating an exemplary embodiment of the present invention.

FIG. 2 is a flow diagram that represents one exemplary embodiment of the present invention for a method for the selection and execution of a profile that is stored within a multifunction device 130. At step 205, a profile is received by the processor 110. The received profile is stored in the SDS 125 at step 210 and a listing of the stored profiles, including the received profile, is displayed on the console 135 at step 215. In some embodiments, the provided listing can include currently stored profiles, and one or more profiles need not be received and stored as provided in steps 205 and 210.

Figure 4:
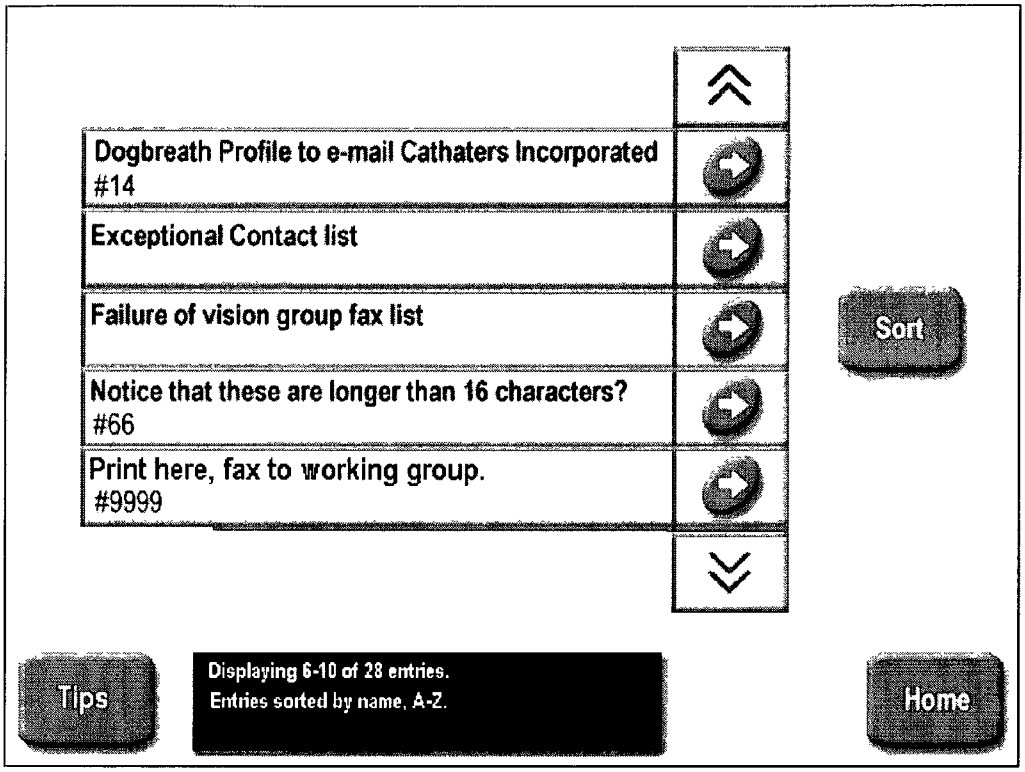

A user selects an executable profile from the displayed listing of profiles at step 220. FIG. 4 depicts an example screen used in one embodiment to provide the list of profiles. At step 225, it is determined whether the selected profile is interactive or non-interactive. If the selected profile is non-interactive then the profile is immediately executed at step 245. If the selected profile is interactive, then at step 235 the system requests that the user interactively input data used to assist in the execution of the profile. The requested data is received and stored at step 240 and used in the execution of the profile at step 245. The request to the user can include a request for entry of at least one non-integer parameter. Such a request can be in any appropriate form including without limitation selecting an option from a menu, entry of textual information or other suitable non-integer input mechanism.

In instances where some execution according to an interactive profile required no further information, the interactive request for data can occur either before or after partial execution of the operation according to the interactive profile. For instance, in a profile defining all scanning parameters but requiring entry of a destination for the scan-generated image, the destination request could occur before or after the scanning so long as the destination parameter is entered prior to the execution of the delivery of the scanned image portion of the profile. Further, in some embodiments, partial execution of the profile can occur prior to any request for data occurs in step 235.

In some instances, additional interactive data can be required at different points in profile execution. For instance, additional data requests can occur based upon received previously requested data. In addition, additional data requests can occur after some level of profile execution.

The user console of the multifunction device in some embodiments contains a Start button. The Start button can be either a hardware button with mechanical or touch sensitivity or software-based and actuatable via a touch screen, or portion thereof. In some embodiments, pressing Start while an interactive prompt is displayed causes the multifunction device to accept any valid default (or user supplied) values for the currently displayed prompt, and any additional prompts (including those that have not yet been displayed). If all remaining prompts have valid values, no more prompts need be displayed. Only the prompts without valid values can be displayed, and an error sound, or other sensory indicator (e.g., visual sign, tactile indicator, etc.), can draw attention of the user to the first prompt displayed.

At step 250, a subset of data associated with the pro-ile and/or interactively entered by the user is packaged into a data structure and transmitted to a final destination preceding the scanned document to a final destination at step 255. The packaging of data does not necessarily occur in all embodiments of the present invention.

Figure 3:
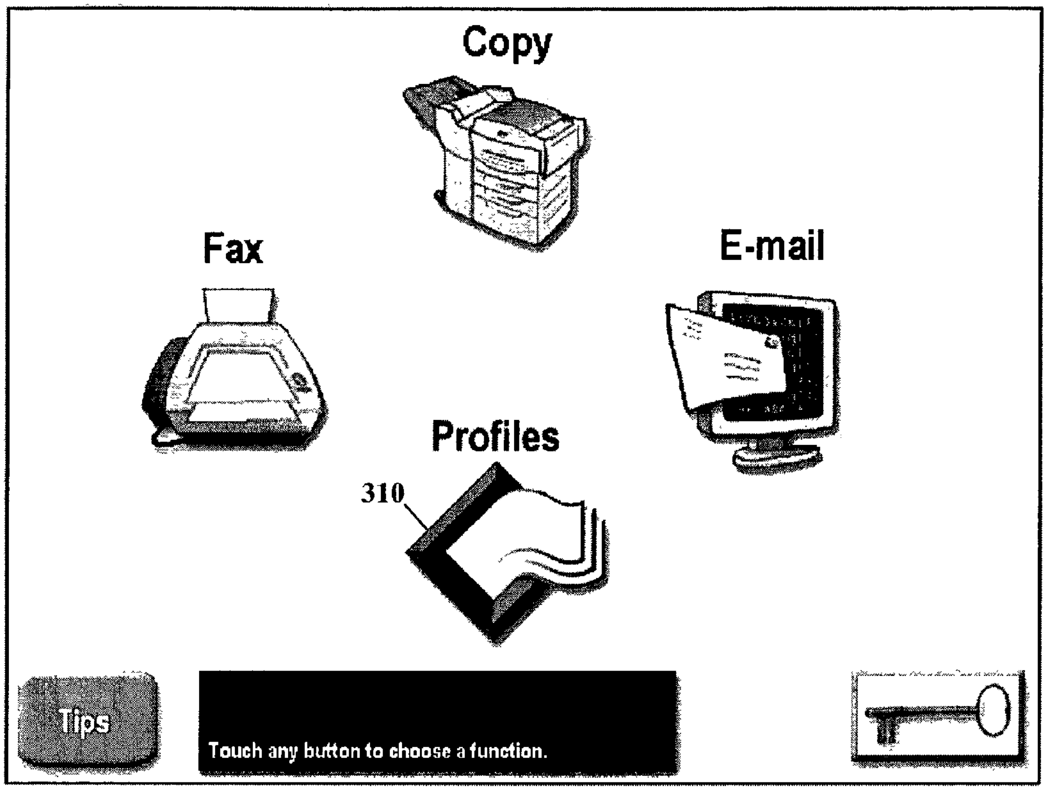
FIGS. 3-11 are example interface screens used with one or more embodiments of the present invention.

FIGS. 3-11 depict sample screens used in one embodiment for interacting with the user of the device. FIG. 3 is an example of initial interface screen. This initial screen displays functions that are available for the user. In some embodiments, the initial display can be configured based upon the presence or absence of particular data in the SDS or functionality in the MFD. For instance, the Profiles button 310 appears in this particular example screen; the presence of this button could be based upon at least one profile stored in the SDS. Were no profiles resident in the device, the Profiles button need not appear in such an embodiment.

FIG. 4 is an example profile selection screen. This particular example screen depicts an interface indicating 28 profiles stored in the SDS. In the depicted embodiment, the list contains the name assigned to the profile and, if available, a shortcut number associated with that profile. In addition to starting a profile by touching an item in the list, a profile with a shortcut number can also be started in embodiments employing shortcut numbers by entering the shortcut number on a numeric keypad located to the right of the screen.

Some embodiments, including the one depicted, can include a facility for sorting the stored profiles. Touching the Sort button cycles through methods of sorting the list that can include, without limitation, alphabetically by name A-Z, alphabetically by name Z-A, by shortcut number lowest to highest, and by shortcut number highest to lowest. In one embodiment, the current type of sorting, and current position in the list, is displayed in a message field on the screen. In this example, users alter the entries currently displayed by using the up and down arrow buttons at the top and bottom of the list. Other embodiments can support any variety of known navigational icons and/or buttons. In some embodiments, users may access profile-specific help information by touching the Tips button on the left, or return to the initial interface screen by touching Home.

FIGS. 5-11 depict exemplary screens used in connection with interactive profiles to request information from and/or provide information to the device user.

Figure 5:
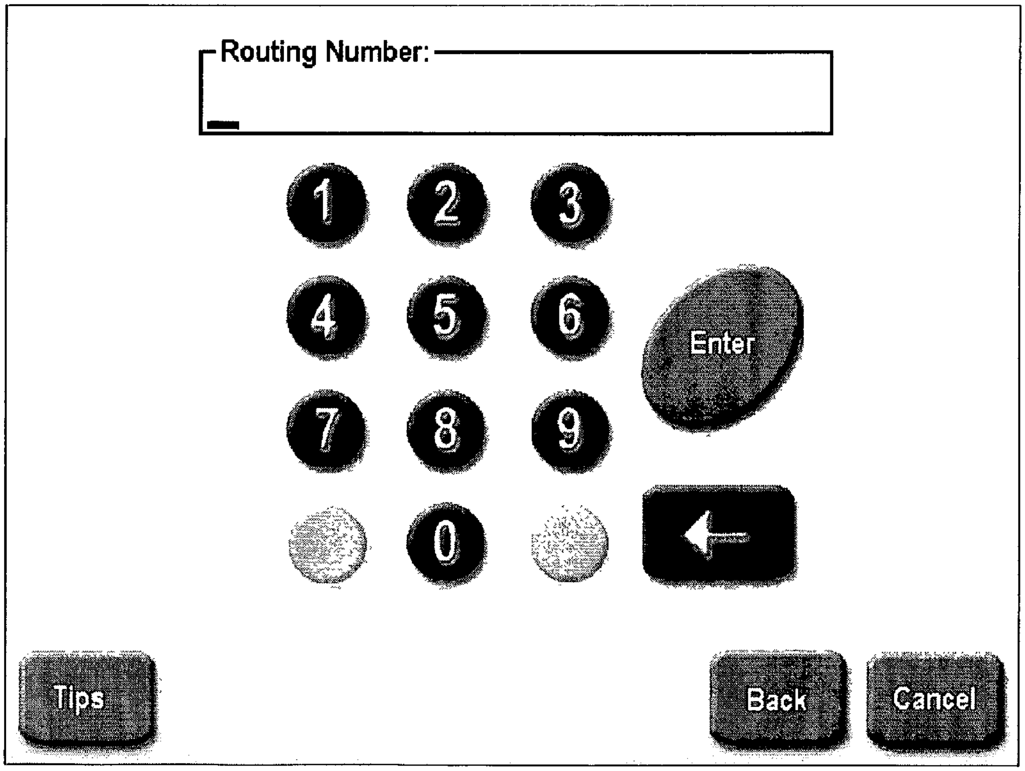

FIG. 5 depicts an exemplary screen for entering numeric information. In this particular example, the profile source has specified "Routing Number" as the indicator for the type of information the user is being requested to provide. In some embodiments, a default value can be specified. If such a default numerical value is specified, it could appear, for example, in the box just under "Routing Number." Some embodiments, such as the one depicted, can include a message area for providing additional information relative to the requested information. For instance, had an optional minimum or maximum integer value been specified by the profile source, that information could appear in a message field between the buttons labeled "Tips" and "Back."

As with the prior example screen, some embodiments can include context sensitive assistance and/or navigation. For instance, in some embodiments, touching the Tips button provides the user with an explanation for entering numeric information in this type of prompt. The presence of a Back button in this example can indicate that this is not the first prompt of the profile, and selecting it will open the previous prompt.

In some embodiments, touching the Cancel button will quit the profile, sending the user back to the profile selection screen (e.g., FIG. 4), or to an initial selection screen (e.g., FIG. 3). After entering numeric information, touching the button labeled Enter can either open the next prompt or begin/continue execution of the selected profile. Some embodiments can include a context sensitive "accept" button that includes a suitable textual label identifying the next stage in data acquisition or profile execution (e.g., "Enter", "Next", "Start", "Continue", etc.).

Figure 6:
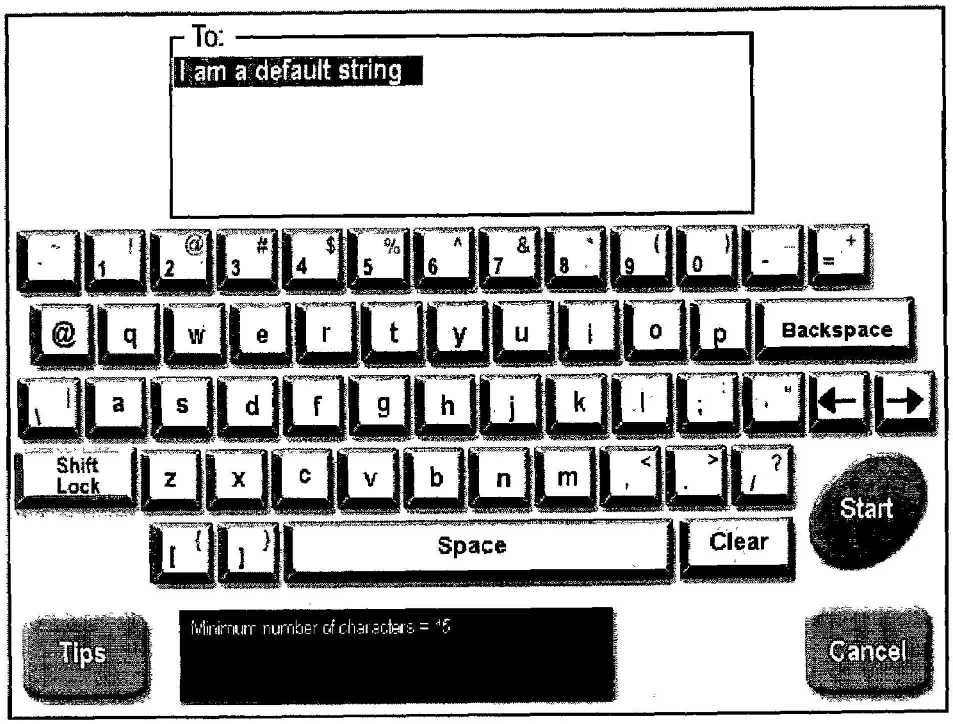

FIG. 6 depicts an exemplary screen for a prompt requesting text input. In this particular example, the profile source has specified "To" as the indicator for the type of information the user is being requested to provide. As with the prior example screen, some embodiments can include a message area providing additional information concerning the requested data. In this particular example as depicted, no optional maximum on the number of characters that may be entered has been specified, but an optional minimum number of characters (15) has been specified by the profile source, as indicated in the message field at the bottom of the depicted example screen.

In some embodiments, when optional restrictions such as minimum or maximum inputs are requested by the profile source, user input can be checked by the system prior to allowing the profile process to move beyond the restricted prompt. Again, some embodiments can support contextual help and/or navigation. In the depicted example screen, help information on how to use the text prompt is accessed by touching the Tips button. Forward progress beyond this request would be accomplished via the Start button.

Figure 7:
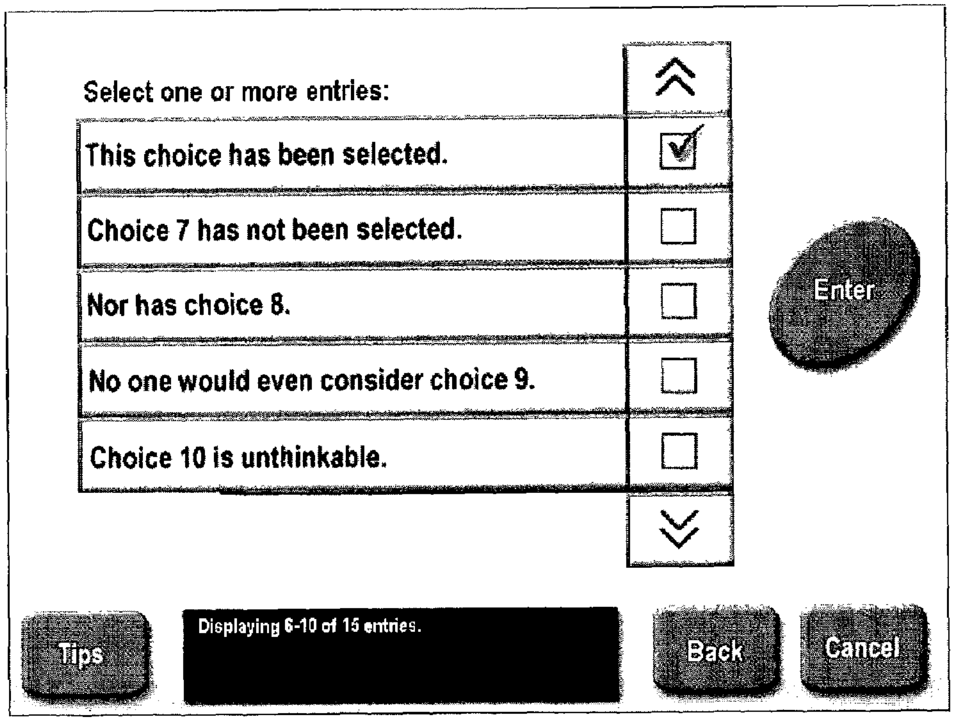

FIG. 7 depicts an exemplary screen for a prompt where multiple selections of options in a list, provided by the profile source, can be made. In this particular example, the profile source has specified "Select one or more entries" as the label for the list. In some embodiments, profiles can support specification of default selected items that will appear as selected when initially displayed to the user.

The profile further specifies the labels for the various items in the list. In the depicted example, default selections, if present, and user selections appear with a check in the box at the end of the selection, as exemplified in this example for entry 6 ("This choice has been selected.") Touching an item already selected removes the checkmark, and the selection of that entry.

Different embodiments can provide varying levels of support for profile specification of allowable entries for such a prompt. In some embodiments, no constraints are supported; in such embodiments, any number of items can be selected or not selected including none or all. In other embodiments, profiles can specify a constraints as to maximum number, minimum number or absolute number of selected items required.

Figure 8:
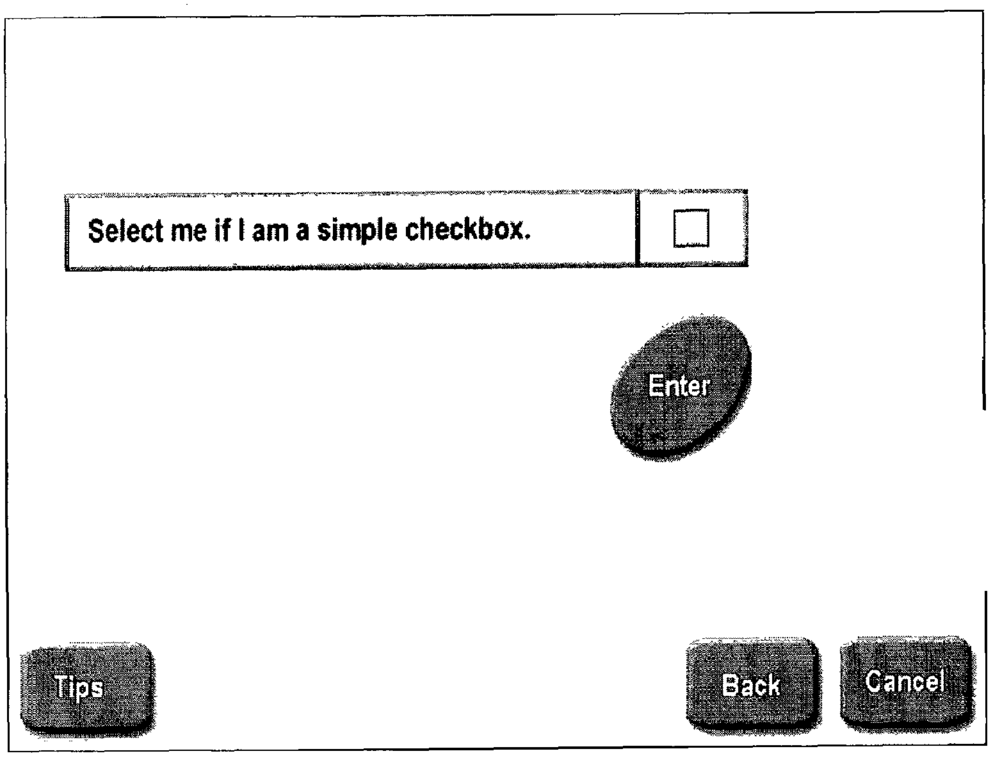

FIG. 8 depicts an exemplary screen for a prompt where a checkbox is used to prompt for a single boolean selection. The profile source, in this particular example, has provided "Select me if I am a simple checkbox" as the basis for the boolean selection. The profile source, in some embodiments, has the option of providing a default selection for the prompt. Each touch of the button with the statement alternates between selected for a value of true or yes (indicated by a check in the box at the end of the button) or not selected, with a value of false or no. In this particular example the value is currently false or no, since no check appears.

Figure 9:
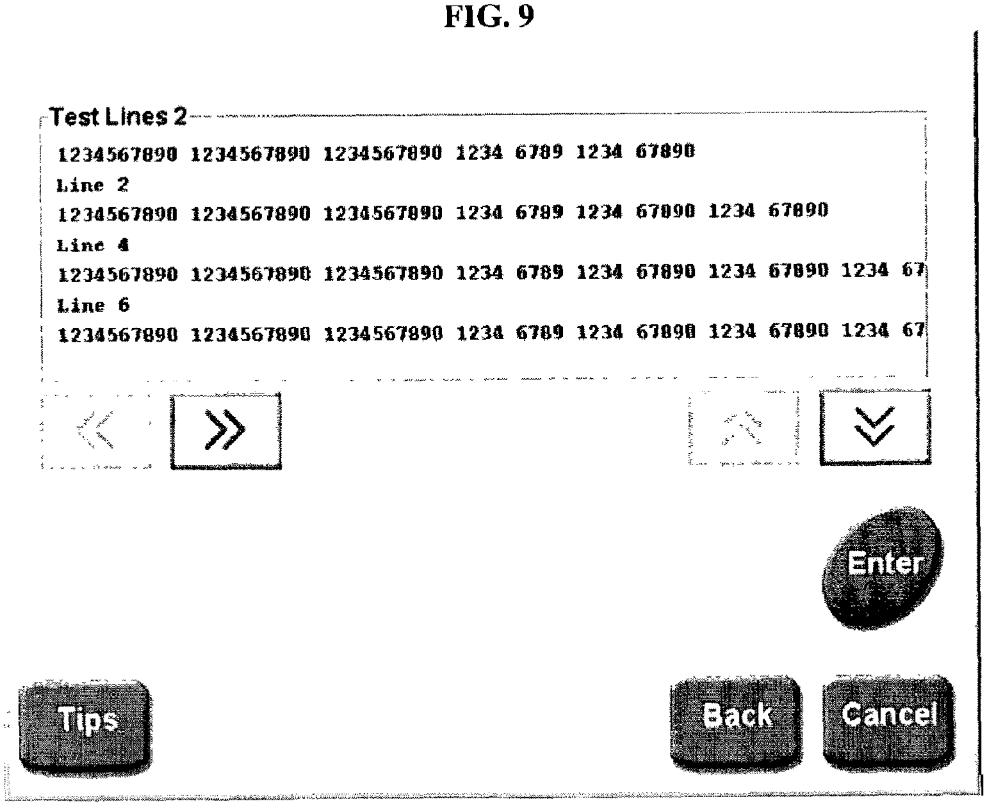

FIG. 9 depicts an exemplary screen for a prompt where the user is provided information, rather than being required to select or enter information. In this particular example, the profile source has indicated a title of "Test Lines 2" for the message. The text of the message in this example extends both below and to the side of the viewable area, and the left/right and up/down buttons (below the viewable area) can be touched by the user to scroll through the area of the message displayed in the viewable area. The presence or absence of scrolling controls can be included on an as needed basis in some embodiments. In other embodiments the scroll controls can be included in all such text message presentations whether the content is greater than fits within the viewable area or not.

Figure 10:
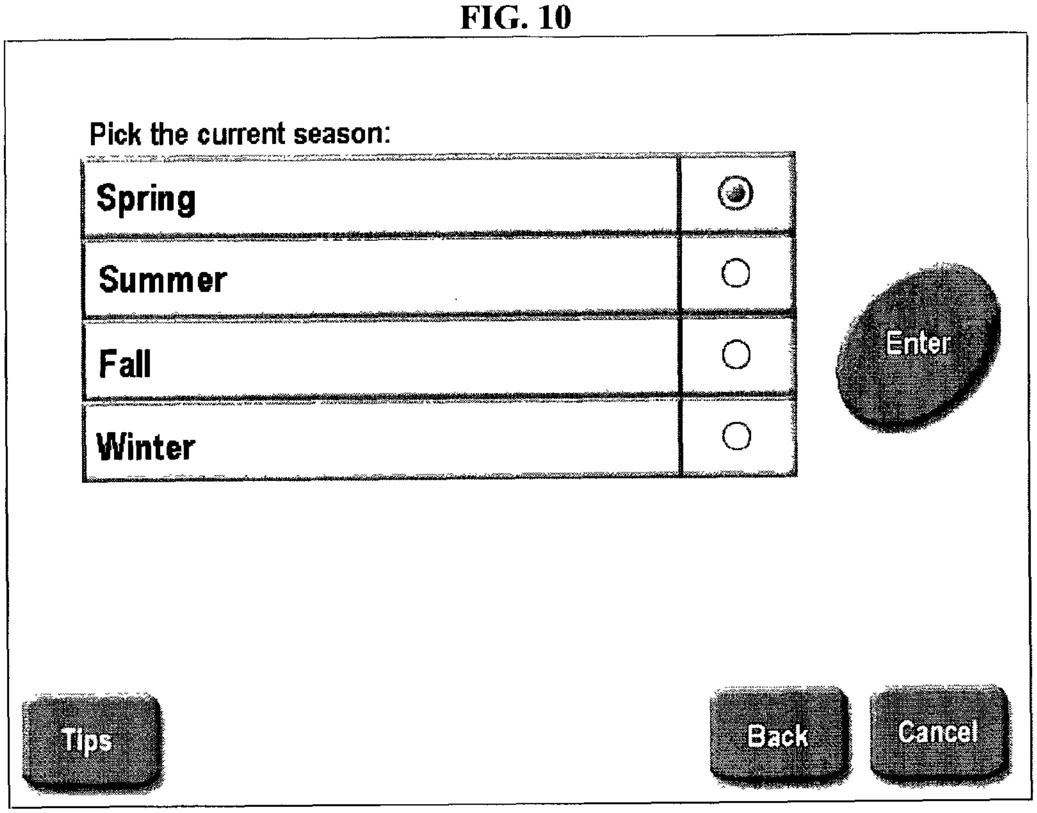

FIG. 10 depicts an exemplary screen for a prompt requesting the selection of a single option from a list provided by the profile source. In this particular example, the profile source has provided "Pick the current season" as the indicator for the user. In some embodiments, one entry from the list mist be provided as a default, and only one element may be selected at a time. Touching an entry that is not currently selected will move the selection, indicated by the filled circle, to the entry touched, and remove it from the current entry. Since one option must be selected at all times, touching a currently selected entry has no effect.

Figure 11:
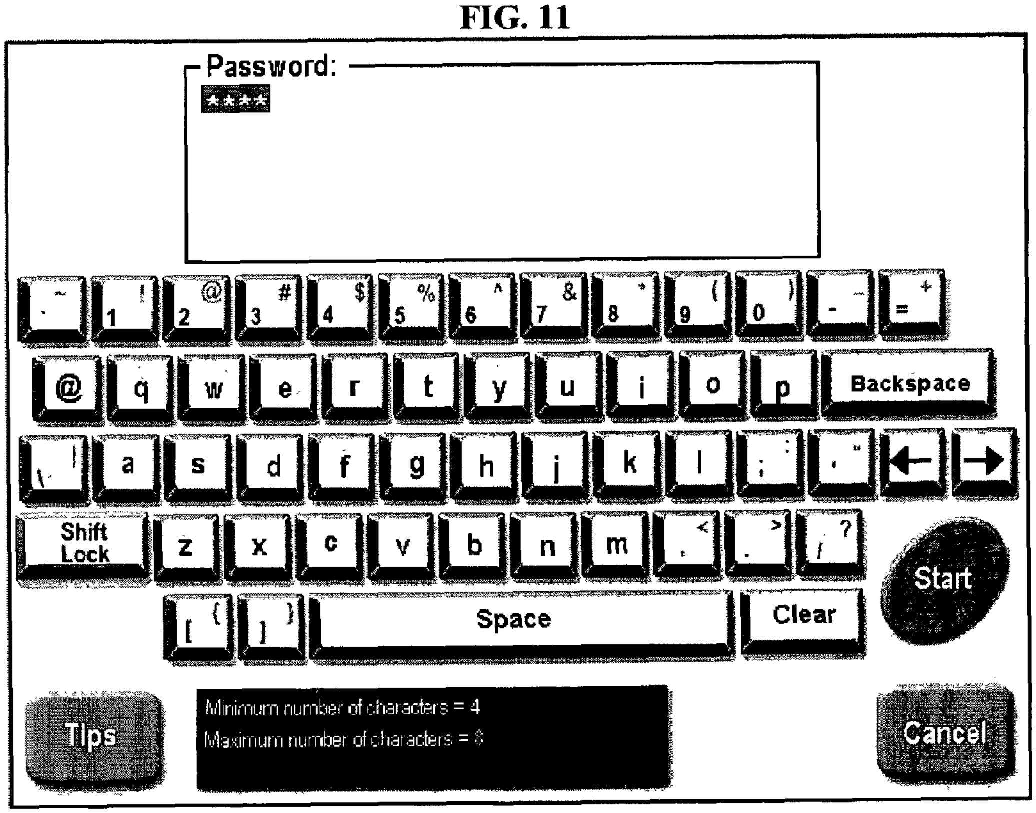

FIG. 11 depicts an exemplary screen for a prompt requesting text information of a potentially sensitive nature, such as a password used to access 9 protected database. With the exception of displaying asterisks (or other characters, including blank spaces) rather than entered text, this data request type follows all the rules associated with entering text information in text prompts as illustrated by the example screen of FIG. 6. In the depicted example, the user is prompted to enter a "Password," and the optional minimum number of characters has been set by the profile source to 4, with the optional maximum number of characters set to 8.

Other aspects of the invention may be found from the attached drawings and other related materials such as a detailed review of the various functions offered by the present invention, which are integral parts of this disclosure. Moreover, other embodiments of the invention will be apparent to those skilled in the art from consideration of the specification and practice of the invention disclosed herein. It is intended that the specification and examples be considered as exemplary only.

What is claimed:

1. A method for the selection and execution of an interactive profile stored within a multifunction device, the method comprising the steps of:

receiving a plurality of scanning destination interactive profiles from a remote source via a network;

storing the received interactive profiles in a system data store, wherein each stored profile comprises a set of executable instructions to the multifunction device that control a subset of methods and settings used in the scanning and disposition of a document to be scanned by the multifunction device;

displaying a representation of the interactive profiles stored in the system data store to a multifunction device user in response to a user's actuation through a user console associated with the multifunction device without previously displaying to the user a representation of only a single predetermined one of the interactive profiles;

receiving a profile selection based upon a user s interaction with the displayed profiles;

requesting information from a multifunction device user in connection with the selected profile which requires the user to type in at least one non-integer parameter;

responsive to the request, receiving one or more typed parameters;

performing an operation of the multifunction device based upon the profile selection and any received parameters, wherein the operation comprises scanning a document;

packaging profile information or information associated with the received one or more parameters into a data structure; and transmitting the data structure and the scanned document to a destination.

2. A computer readable storage environment comprising one or more storage devices or media storing instructions that upon execution by a system processor cause the system process to manage and execute interactive profiles within a multifunction device in accordance with the method of claim 1.

3. The method of claim 1, wherein the requested information is a password.

4. A computer readable storage environment comprising one or more storage devices or media storing instructions that upon execution by a system processor cause the system process to manage and execute interactive profiles within a multifunction device in accordance with the method of claim 3.

5. The method of claim 1, also including providing information to the user in connection with the selected profile and in connection with the requested information.

6. A computer readable storage environment comprising one or more storage devices or media storing instructions that upon execution by a system processor cause the system process to manage and execute interactive profiles within a multifunction device in accordance with the method of claim 5.

7. The method of claim 5, wherein the provided information identifies a size restriction on the at-least-one non-integer parameter.

8. A computer readable storage environment comprising one or more storage devices or media storing instructions that upon execution by a system processor cause the system process to manage and execute interactive profiles within a multifunction device in accordance with the method of claim 7.

9. A system for the selection and execution of a profile, comprising:

output means for rendering output perceivable by a multifunction device user;

input means for receiving input from a multifunction device user; receiving means for receiving a plurality of scanning destination profiles from a profile source via a network;

storing means for storing the received profiles; and processing means for:

storing the profiles received by the receiving means in the storing means;

displaying a representation of the profiles stored within the storing means via the output means without previously displaying a representation of only a single predetermined one of the profiles;

receiving an indicator corresponding to a selected profile in response to an entry by a multifunctional device user via the input means;

if the selected profile is interactive:

a) requesting information from a multifunction device user in connection with the selected profile which requires the user to type in at least one non-integer parameter based upon the profile selection; and b) responsive to the request, receiving one or more typed parameters;

executing the selected profile to perform an operation of the multifunction device, wherein the operation comprises scanning a document;

packaging profile information into a data structure; and transmitting the data structure and the scanned document to a destination.

10. The system of claim 9, wherein the requested information is a password.

11. The system of claim 9, wherein the processing means includes means for providing information to the user in connection with the selected profile and in connection with the requested information if the selected profile is interactive.

12. The system of claim 11, wherein the information identifies a size restriction on the at-least-one non-integer parameter.

* * * * *